United States Patent

Yun

[11] Patent Number: 5,909,471
[45] Date of Patent: Jun. 1, 1999

[54] METHOD AND SYSTEM FOR RAPID INITIAL CONTROL SIGNAL DETECTION IN A WIRELESS COMMUNICATIONS SYSTEM

[75] Inventor: Louis C. Yun, Santa Clara, Calif.

[73] Assignee: Arraycomm, Inc., San Jose, Calif.

[21] Appl. No.: 08/907,594

[22] Filed: Aug. 8, 1997

[51] Int. Cl.[6] .............................. H04L 27/06; H04L 7/00
[52] U.S. Cl. .......................................... 375/343; 375/365
[58] Field of Search .................................... 375/368, 365, 375/200, 342, 343; 371/42, 46

[56] References Cited

U.S. PATENT DOCUMENTS 5,809,009  9/1998  Matsuoka et al. ...................... 375/368

*Primary Examiner*—Don N. Vo
*Assistant Examiner*—Albert C. Park

*Attorney, Agent, or Firm*—Townsend and Townsend and Crew LLP; Henry K. Woodward

[57] ABSTRACT

A wireless communication subscriber unit comprises a radio frequency downconversion stage that produces in-phase and quadrature phase digital samples. A digital signal processor is connected to receive the samples and process them to produce a control channel correlation output and a carrier frequency offset estimate. The acquisition of the control channel is made substantially immune from initial carrier frequency offsets by differential sample encoding the samples. These are input to a correlator whose coefficients are a pre-stored differential sample encoded, decimated and rate expanded version of the known reference sequence. When the the reference sequence is present, the correlator produces a peak output that can be used to detect the presence of the reference sequence. The time position of the peak can be used for time alignment, for signal quality estimation, and to directly obtain a frequency offset estimate.

29 Claims, 3 Drawing Sheets

METHOD AND SYSTEM FOR RAPID INITIAL CONTROL SIGNAL DETECTION IN A WIRELESS COMMUNICATIONS SYSTEM

FIELD OF INVENTION

The invention relates generally to wireless communication systems and more specifically to initial signal detection, frequency offset estimation and timing alignment estimation in a receiver of a wireless communication system.

DESCRIPTION OF THE PRIOR ART

Mobile and fixed cellular wireless communication systems have become popular throughout the world. The cellular concept includes using one or more base stations (BS) which, for telephone systems, are connected to the public switched telephone network (PSTN). Remote terminals, also called subscriber units (SU) and handsets, connect to each base station using wireless communications and agreed upon protocols. With mobile cellular systems, the remote terminals are portable, and may be carried on a person or in a car, etc. In a fixed cellular system, also called a wireless local loop (WLL) system, the remote terminals are fixed in location. Such WLL systems are useful for adding telephone services to remote regions and/or in countries that do not already have an extensive wired telephone infrastructure.

Modem cellular systems are digital, and several standards exist for the protocols. Digital systems typically use frequency division multiple access (FDMA) techniques, time division multiple access (TDMA) techniques, a combination of TDMA with FDMA (TDMA/FDMA), or code division multiple access (CDMA) techniques. For example, with an FDMA/TDMA system, the frequency spectrum is divided into frequency channels, and each frequency channel is divided into timeslots. In a CDMA system, each channel is assigned a particular spread spectrum code. Duplexing (two-way communication) may use time division duplexing (TDD) where some of the timeslots within a frequency channel are used for the downlink (base station to subscriber unit) and others within the same frequency channel for the uplink (SU to BS). Frequency division duplexing (FDD) also is possible wherein uplink and downlink communication occur in different frequency channels. Similarly, code division duplexing is possible.

Recently, spatial division multiple access (SDMA) systems have been introduced. SDMA base stations use an array of antenna elements instead of a single antenna element, together with spatial processing, to enable a lower reuse factor and/or simultaneous communications between the BS and more than one remote terminal over the same "conventional" (frequency, frequency and timeslot, or code) channel. Spatial processing includes weighting the signals received (in the uplink) or transmitted (in the downlink) from or to each of the antenna elements by a complex valued (i.e., amplitude and phase) weight, the weights to or from a particular user determined from the "spatial signature" of that user, which is a function of the location of that user.

Two examples of standards for TDMA/FDMA systems are Global System for Mobile Communications (GSM) and the Personal Handyphone System (PHS). GSM is very popular throughout the world, and exists also in a high frequency version called DCS-1800, and in the USA as the PCS-1900 standard for personal communication systems (PCS). PHS is popular in Japan and becoming more popular in other countries. PHS is TDMA/FDMA TDD system while GSM is a TDMA/FDMA FDD system. Standard GSM is most popular for high mobility cellular communications, and standard PHS is mostly used in low mobility personal communications.

In a wireless communication system, the subscriber unit must identify itself to the wireless network when the SU is first turned on. To do this, a network control channel is provided for such signaling. In the PHS protocol, particular frequency channels and timeslots are allocated as control channels. Three types of control messages are transmitted in the PHS control channel. The broadcast control channel (BCCH) message is broadcast from time to time on the downlink from the base station to the many SUs and it describes the timeslot structure and base station identification. The BCCH message has a sequence of bits within it that will follow a known pattern. In the PHS standard, a control message includes a 62-bit preamble and a 32-bit "Unique Word" sequence, both of which are prearranged and known to every SU. This pattern can be searched for and uniquely identified by a SU looking to acquire the control channel. The paging channel (PCH) message is a downlink message that is used to notify individual SUs of an incoming call, The signaling control channel (SCCH) is used on the uplink and downlink to exchange information needed to support a call connection. In PHS, PCH and SCCH messages include the same preamble and Unique Word.

When a SU powers up, it must search in time and frequency for the BCCH message. Acquisition of the BCCH message is necessary in order to establish the correct control channel structure and control message timing with the SU. Only after the SU has acquired the BCCH may it then uplink to the base station, e.g., to register its presence. Once that is established, the process of call connections continues through well-defined protocols, e.g., see, "Personal Handyphone System," Association of Radio Industries and Businesses Standard, Version 2, RCR STD-28 (Japan).

Several methods are known for initially connecting a remote terminal to a cellular base station, for example in response to the remote terminal being first switched on. In one prior art technique, the frequency channels (for FDMA), frequency channels and timeslots (for TDMA/FDMA) or codes (for CDMA) of the control channels are known by the SU, and the SU initially measures a receive level for each known control frequency (or code), then, in decreasing received signal level order, it synchronizes to the active timeslot or code to receive the network identification data. Other techniques are described in U.S. Pat. No. 5,640,675 issued to Pinualt et al. on Jun. 17, 1997, entitled *Method And System For Reducing The Time For Connecting A Mobile To A Cellular Base Station.* These prior art techniques are particularly applicable to GSM TDMA/FDMA systems where the SU includes a Subscriber Identity Module (SIM) that describes the user's home network and includes a non-volatile memory. This non-volatile memory is used to store a list of control frequencies to search during connection.

Rather than search for signal levels at known control frequencies, an improved prior art technique includes searching for known bit sequences that are broadcast by base stations in logical channels called control channels. For example, in PHS, this might be for part or all of the sixty-two bit known preamble sequence and/or part or all of the thirty-two bit known "Unique Word" sequence that are in all control messages, including the BCCH and PCH, and it is known how to search for such sequences, for example, using correlation methods.

Such search methods however still suffer from the presence of large frequency offset distortions, from the fluctuations in the received signal strength, and from the presence of noise and/or other interfering signals. Correlation techniques also are known to be computationally expensive. A typical SU may need to be inexpensive and use low power, so may only have limited computing power.

Once a control message has been detected, there still is a need to determine timing alignment including message timing, frequency offsets, and an estimate of the quality of the received signal.

SUMMARY OF THE PRESENT INVENTION

It is therefore an object of the present invention to provide a method for initial control channel acquisition in a wireless communication system that is rapid and simple to implement.

It is another object of the present invention to provide a subscriber unit capable of initial control channel acquisition which is substantially tolerant to frequency offsets in a wireless communication system.

It is a further object of the present invention to provide a method for frequency offset estimation in a wireless communication system.

It is a still further object of the present invention to provide a method for signal quality estimation in a wireless communication system.

It is another object of the present invention to provide a subscriber unit capable of providing message or frame timing and baud point estimates in a wireless communication system.

Briefly, a subscriber unit embodiment of the present invention comprises an analog RF front end and a digitizing and downconversion stage that produces complex valued (i.e., in-phase I and quadrature-phase Q) 8-bit digital samples of a baseband signal. A control signal is periodically transmitted to SUs and includes a reference signal of a sequence of bits. The control signal is transmitted on a prearranged channel, where "channel" means a frequency channel in an FDMA system, a timeslot in a TDMA system, or code in a CDMA system, and a timeslot and frequency channel in a TDMA/FDMA system. The preferred embodiment is in a base station of a TDMA/FDMA system using PHS. A digital signal processor is connected to receive the samples and process them to produce a control channel correlation output and in some embodiments, a carrier frequency offset estimate. The acquisition of the control channel is made substantially immune from initial carrier frequency offsets by differential sample encoding the samples. The differential sample encoding is at the symbol rate. These differential sample encoded samples are input to a correlator that uses as the (typically) previously stored correlator coefficients, a differential sample encoded, then decimated and rate expanded (to provide for rapid calculations), then normalized. version (typically modulated) of a reference signal (sequence of bits) to be searched for. When the reference signal is present, the correlator produces a peak output. The time position of the peak can be used for time alignment, and also to directly obtain a frequency estimate. A measure of the correlator output also can be compared with a measure of the amplitude of the signal to provide an indication that the presence of the reference signal was detected. The angle of the complex correlation that occurs at such correlation peak is divided by $2\pi$ and divided by the symbol period to produce the frequency offset estimate, and in some embodiments, where a measure proportional to the estimate is sufficient, the angle is provided as such a measure.

An advantage of one aspect of the present invention is that a method of control channel signal acquisition is provided that is robust and substantially independent of any reasonable initial carrier frequency offset.

Another advantage of another aspect of the present invention is that a method is provided that is tolerant to reasonable amplitude variations in the received signal and to the presence of interference.

A further advantage of another aspect of the present invention is that a subscriber unit is provided that is reliable and economical to manufacture.

A still further advantage of another aspect of the present invention is that a carrier frequency offset estimation method is provided that is quick and simple to obtain from the control channel signal acquisition.

A still further advantage of another aspect of the present invention is that a time alignment estimate is provided that is quick and simple to obtain from the control channel signal acquisition.

A still further advantage of another aspect of the present invention is that a signal quality estimation method is provided that is quick and simple to obtain from the control channel signal acquisition.

These and other objects and advantages of the present invention will no doubt become obvious to those of ordinary skill in the art after having read the following detailed description of the preferred embodiment which is illustrated in the drawing figures.

DETAILED DESCRIPTION OF THE PREFERRED EMBODIMENTS

Hardware on which the preferred embodiment methods are implemented

The preferred embodiments of the present invention are implemented in a wireless subscriber unit of a wireless local loop system which uses the PHS protocol, and communicates with base stations that use SDMA. It will be clear to those of ordinary skill in the art that the various aspects of the invention also may be applied to any communication system which suffers from frequency offsets, i.e., any passband system, and any system which transmits a known sequence that may be initially detected. The system may use any digital modulation, may use FDMA, TDMA, CDMA, or TDMA/FDMA, etc., may include or not include SDMA, may be fixed or mobile, etc.

Figure 1:
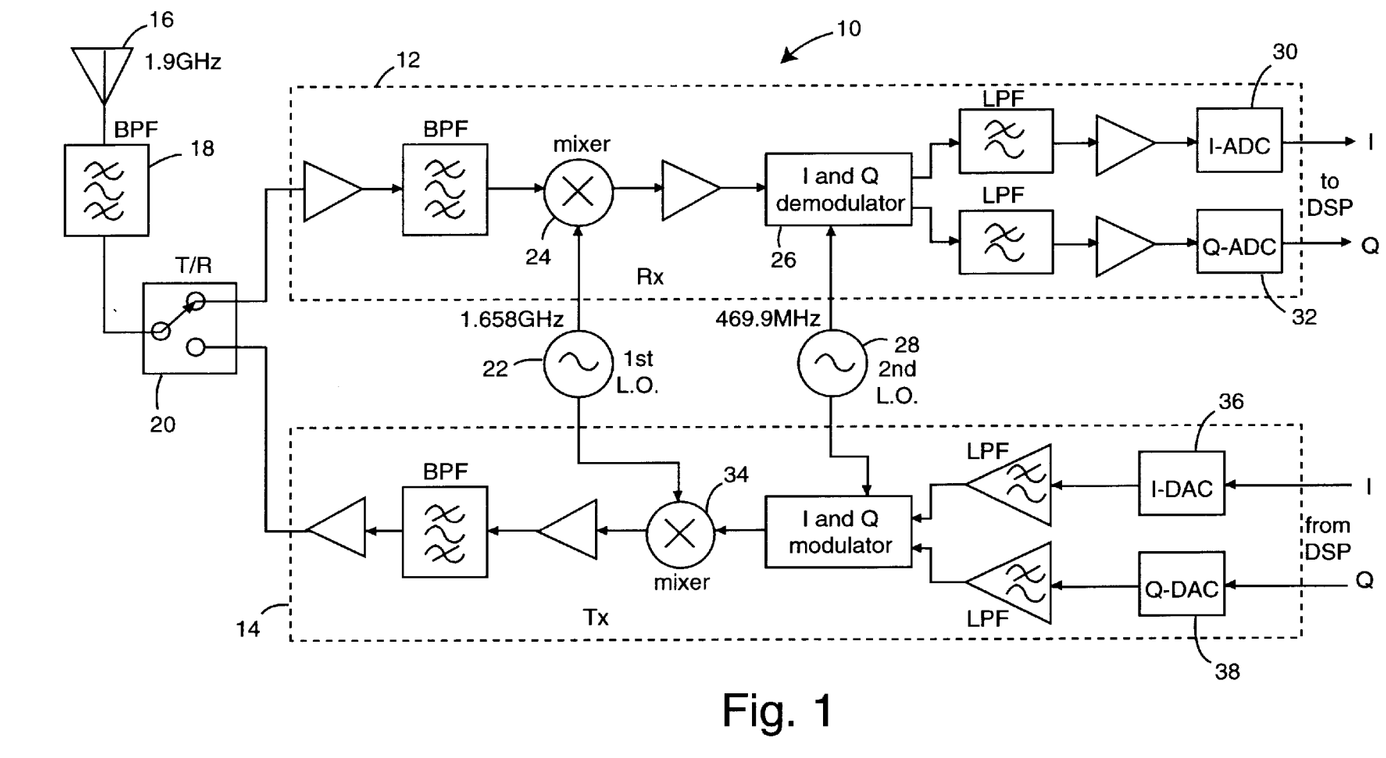
FIG. 1 is a functional block diagram of the RF section of a subscriber unit embodiment of the present invention with a receiver front end and a transmitter final stage.

FIG. 1 illustrates the RF sections of a wireless telephone subscriber unit (SU) embodiment of the present invention, these RF sections referred to herein by the general reference numeral 10. RF sections 10 include a receiver front end 12 and a transmitter final stage 14 each connected to an antenna 16 through a bandpass filter 18 and a transmit/receive (T/R) switch 20.

The received signals go through a typical downconversion using a 1658 MHz first local oscillator 22 connected to a first intermediate frequency (IF) mixer 24 that produces an IF of 248.45 MHz. The in-phase (I) and quadrature (Q) signals are separated by an I, Q demodulator 26 connected to a second local oscillator 28 operating at 469.9 MHz.

A typical local oscillator is crystal controlled and will have an accuracy of about ±10 ppm, or ±20 kHz at the 1.9 GHz RF carrier frequency. The local oscillators in the present invention are preferably the phase locked loop (PLL) type so the initial crystal frequency errors can be largely mitigated out by adjusting a voltage controlled oscillator (VCO) once the control channel is acquired. In PHS, a 20 kHz error translates to a phase error of 37.5 degrees over the duration of one symbol period. It is common to use decision-directed carrier recovery in demodulating DQPSK signals as used in PHS. If noise is present, a decision-directed carrier recovery method will likely break lock, unless an initial coarse frequency correction is applied. In the particular π/4 QPSK demodulation used in the PHS embodiment, when the frequency offset phase error reaches 45 degrees over the symbol period duration, the decision direction frequency offset estimation will break lock completely, and the bit error rate (BER) will skyrocket.

An in-phase analog-to-digital converter (I-ADC) 30 produces 8-bit I-samples at a rate of 768 kilosamples/second. A quadrature phase analog-to-digital converter (Q-ADC) 32 similarly produces 8-bit Q-samples at the same rate of 768 kilosamples/second.

The transmitted signals go through a typical up-conversion using the 1658 MHz local oscillator 22 connected to a final radio frequency (RF) mixer 34. The in-phase (I) and quadrature (Q) signals to be transmitted are received as a stream of 8-bit I-samples at a rate of 768 kilosamples/second by an in-phase digital-to-analog converter (I-DAC) 36, and as a stream of 8-bit Q-samples at the rate of 768 kilosamples/second by a quadrature phase digital-to-analog converter (Q-DAC) 38.

Figure 2:
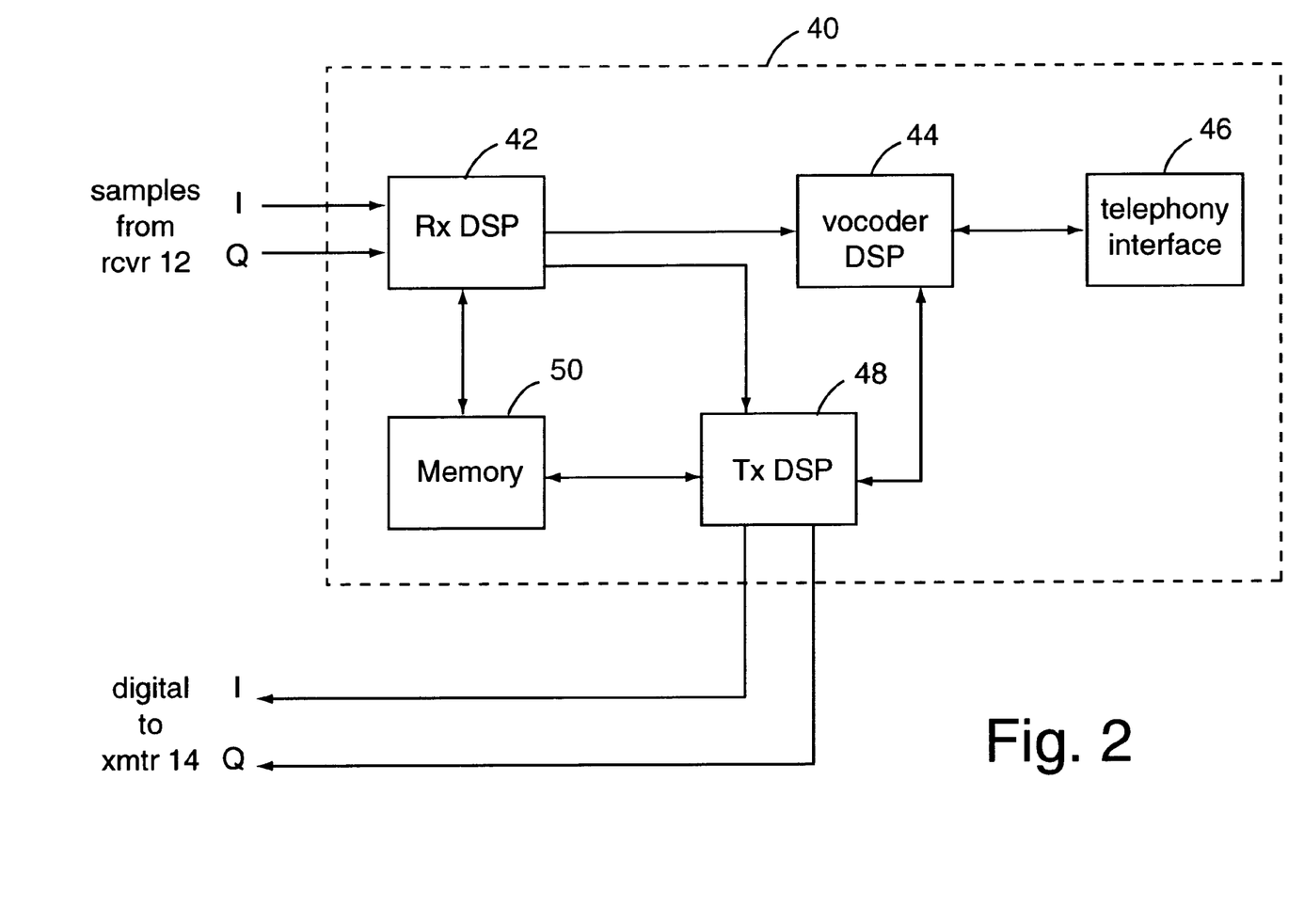
FIG. 2 is a block diagram of the digital signal processing components that complement the RF section of FIG. 1.

FIG. 2 is a block diagram of a digital signal processor (DSP) section 40 that receives the I/Q-samples from the receiver front end 12 and that produces the I/Q-signals to be sent out by the transmitter final stage 14. The DSP section 40 includes several DSP devices, including a receiver-DSP (Rx-DSP) 42 that is connected to a voice encoding DSP device (vocoder) DSP 44 and a telephony interface 46. A transmitter-DSP (Tx-DSP) 48 receives voice/data from the interface 46 and encodes them into the proper I/Q-signals for transmission by the transmitter final stage 14. A fast memory 50 supplies program execution and support memory for the Rx-DSP 42 and Tx-DSP 48. A Motorola (Phoenix, AZ) DSP56303 24-bit digital signal processor is used for each of the Rx-DSP 42 and Tx-DSP 48. The DSP56303 is a member of the DSP56300 core family of programmable CMOS DSPs. This family uses a high performance, single instruction per clock cycle engine. The architectural features of the DSP56300 core family include a barrel shifter, 24-bit addressing, instruction cache, and DMA. Other DSP devices or microprocessors may be substituted, as would be clear to one of ordinary skill in the art.

Referring to FIG. 1, RF signals with carriers at approximately 1900 MHz are used to produce in-phase ("I") and quadrature ("Q") components that are detected using a 469.9 MHz carrier. The I and Q signals are digitized and sampled at four times the symbol rate. For the PHS system used in the illustrative embodiment the symbol rate is 192 kHz, so the sampling rate in this example would be 768 kilosamples/sec. Each sample is 8-bits deep.

In FIG. 2, the received digital I and Q signals are digital-signal processed by the Rx-DSP 42. The Rx-DSP 42 is preferably programmed to:

1. collect I and Q samples from the ADCs 30 and 32;
2. do the control-channel acquisition and processing fundamental to time-division duplexing, do the initial estimation of channel-control-data burst timing, and do the initial carrier frequency offset determination, these aspects including the initial control channel acquisition method and other features of the present invention;
3. do unpacking, frequency offset compensation, downconversion, filtering and equalization, wherein a block of four-times oversampled raw baseband samples corresponds to a block of one-time oversampled (192 kHz) signals that are equalized and baud aligned for demodulation;
4. carry out demodulation;
5. disassemble the demodulated burst signals;
6. descramble the messages;
7. do cyclic redundancy checks (CRC);
8. decrypt the traffic data;
9. send the voice traffic data to the vocoder DSP 44;
10. send the control channel signals and channel-quality measurements to the Tx-DSP 48;
11. update the receive compensation filter and frequency offset estimates;
12. in the case of SDMA, compute the calibration information to be sent back to a base station; and
13. update voltage control oscillators (VCOs) and phase lock loop (PLL) (not shown) used in the RF receiver and transmitter part.

Thus the various embodiments of the method of the present invention are carried out in Rx-DSP 42.

The base station in a PHS system periodically transmits a control message in a control channel in order to coordinate all the subscriber units within its purview. In PHS the control message is parked in a reserved timeslot and a reserved carrier. In PHS, three main types of control messages are transmitted on the physical control channel: BCCH (broadcast control channel), PCH (paging channel) and SCCH (signaling control channel) messages. The BCCH message is periodically broadcast on the downlink by a base station BS) to multiple SUs, and it contains the BS identification code, information about timeslot structure of the control channel, such as which timeslots are dedicated to the PCH and SCCH messages, as well as other system information. The PCH message is a downlink message from a BS to a SU, primarily used to notify a SU of an incoming call. The SCCH message may be transmitted on uplink or downlink, and is used for conveying information needed for call connection between the BS and the SU. In many wireless communication systems, including PHS, the control message contains a sequence of known bits. Such pattern is referred to herein as a known-bit sequence, code sequence, reference sequence, etc. The present invention provides for a robust discrimination of this pattern in a confused tangle of competing patterns and signals that can occur in a realworld implementation. The detection of the occurrence of this pattern and its relative timing are key to control channel acquisition, carrier frequency locking, and subsequent use of the established communication link for simultaneous non-interfering telephone communications between many subscriber units and their assigned base station.

In PHS, a control message contains a sixty-two bit Preamble sequence and a thirty-two bit Unique Word sequence, both of which are known a priori. In one aspect of the invention, a version of these known bits are used to construct a reference sequence to be searched for. In the illustrative embodiment, the last eighteen bits of the Preamble and all thirty-two bits of the Unique Word are chosen to construct the version of the reference signal that makes up the reference sequence.

It should be noted that, while in the TDMA/FDMA PHS system of the preferred embodiment, the control channel data is sent in a prearranged timeslot and frequency channel, in an FDMA only system this typically would be a prearranged frequency channel, in a TDMA-only system, this would typically be a timeslot, and in a CDMA system, this typically would be a code. In general, the words "prearranged channel" should be interpreted to be any of these alternatives when different standards are used. It also should be noted that in some systems, the "prearranged channel" can be one of a known or determined set of such "channels".

While the illustrative example describing the present invention is particularly addressed to the problems associated with determining the carrier frequency offset that will occur as the result of an inexpensive crystal oscillator that is not yet phase locked to an acquired RF signal, the initial estimation of burst timing, and the control channel acquisition and processing that are particular to PHS systems, the call acquisition, and the timing and frequency offset estimation aspects of the invention may be applied to any passband wireless systems that use a known sequence during call initiation.

The vocoder DSP 44 receives voice signals from the Rx-DSP 42, and generating voice signals for a telephone handset through the interface 46, it polls for on-hook and off-hook conditions, provides tone detection, and other common telephone handset functions.

The Rx-DSP 42 and Tx-DSP 48 can programmed with the assistance of a high level DSP programming language, e.g., MATLAB (originally, "matrix laboratory"), which is an interactive matrix manipulation program.

MATLAB integrates numerical analysis, matrix computation, signal processing, and graphics in a single environment where problems and solutions are expressed mathematically, and without the overhead of traditional programming languages, in order to support more elaborate applications. The basic data element is a matrix that does not require dimensioning. It enables the solution of numerical problems in a fraction of the time that it would take to write a program in a language such as FORTRAN, Basic, or C. Specialized "toolboxes" are available and provide comprehensive collections of MATLAB functions (M-files) that extend the MATLAB environment in order to solve particular classes of problems. Such toolboxes include signal processing, control systems design, dynamic systems simulation, systems identification, neural networks, etc.

At the present state of the art using MATLAB and Motorola DSP56303's, the implementation of Rx-DSP 42 and Tx-DSP 48 will not be direct. In other words, MATLAB is preferably used to generate the high level code design and run the simulations that validate the design. Compilers are known for compiling MATLAB code into DSP machine code. However, in the preferred embodiment, such compiler-generated machine code is not efficient enough to run the present task on the now available hardware. So manual optimization by a skilled programmer preferably is used: the programmer translates the MATLAB source statements into corresponding assembler code and/or high level language phrases, such as C or C++. This process is a standard one very familiar to real-time process control programmers who often have to count the number of CPU execution cycles that are required for each bit of program code in order to fit a controller into a process-control point.

Therefore, the output of a high-level MATLAB to DSP compiler cannot at present be relied on to maximize the efficiency of every CPU cycle in the Rx-DSP 42 and Tx-DSP 48.

Initial Control Message Detection

When the subscriber unit is first powered up, the carrier phase, symbol phase, and timeslot phase are all unknown and must be searched. The present invention makes the acquisition of the control channel from the base station much easier and quicker by using a correlation technique that is applied to the samples rather than the symbols that is, no demodulation is applied, such a correlation technique substantially removing the sensitivity of the subscriber unit to a lack of carrier phase lock. Essentially, a digital signal processing method is used that removes the carrier signal frequency offset sensitivity from the reference sequence correlation problem. The received samples are "differential sample encoded" before being correlated, where differential sample encoding is the same as conventional differential encoding which normally is applied to bits, converting them into symbols, but here applied to samples of a waveform, which in the case of preferred embodiment is an oversampled sequence. This requires that the known bit sequence also be differential sample encoded into a reference sequence h[n] before being used as the correlating sequence, that is, as the coefficients of a correlator. This is so that the correlator can operate properly. It should be emphasized that while the preferred embodiment is described for a system which includes differential phase modulation (the PHS system uses $\pi/4$ DQPSK), the present invention is independent of whether differential phase modulation is used or not; it works the same in either case Although the particular differential sample encoding described herein preferably is used, any encoding which substantially reduces sensitivity of the amplitude of the correlation peak to frequency or phase offset fluctuations may alternatively be used, and all such encoding shall be referred to herein as "differential sample encoding", which specific differential sample encoding being clear from the context when a particular differential sample encoding is specified. For example, in an improved implementation, the differential sample encoding includes low pass filtering to reduce the noise in the differential sample encoded signal.

Figure 3:
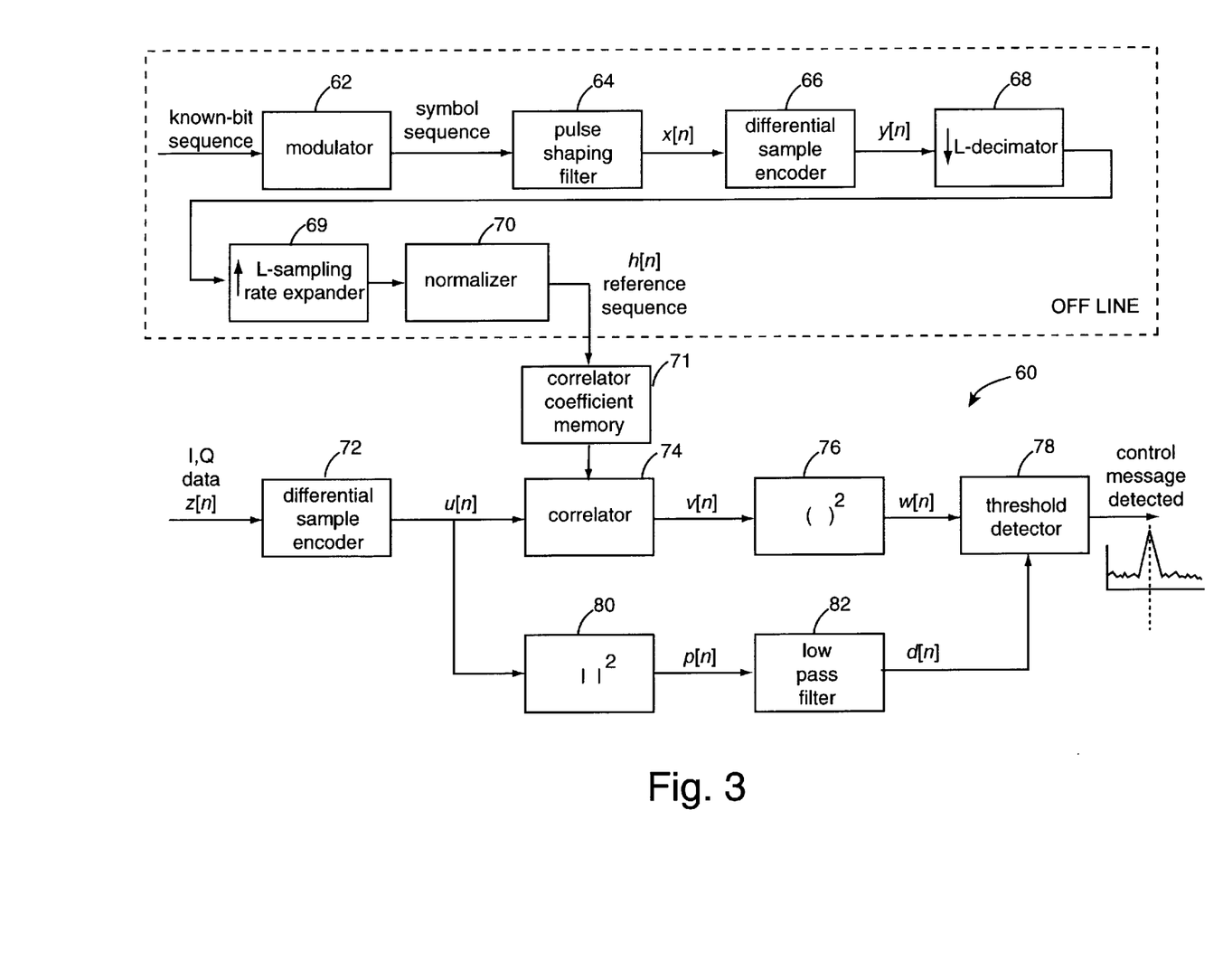
FIG. 3 is a functional block diagram of the differential sample encoding of the baseband received signal and of the correlation processes which are executed by the receiver digital signal processing unit of FIG. 2.

FIG. 3 illustrates a control message detection process 60 that is preferably embodied as a DSP program for the DSPs 42 written in code derived from MATLAB code, and loaded as DSP software in the memory 50.

A version of the reference signal sequence is used to determine the coefficients for a correlator 74. Such correlator coefficient determining is typically carried out once only and off-line rather than in the subscriber unit, and the resulting coefficients are stored in a memory 71 in the SU to be recalled when needed by correlator 74. The determination of coefficients proceeds as follows. The reference sequence is input as some or all of the known-bit sequence to a modulator 62, which produces data symbols. In the illustrative embodiment using PHS, the version consists of modulation of the last eighteen bits of the Preamble and all thirty-two bits of the Unique Word. Modulation of bits into symbols is well known in the art. In PHS, modulator 62 is a $\pi/4$ DQPSK modulator which differentially encodes bits into symbols (not to be confused with differential sample encoding). Thus, modulator 62 produces a complex valued symbol sequence with a symbol period $T_s$. $T_s = 1000/192$ $\mu$s in the PHS system of the illustrative embodiment. A pulse shaping filter (and sampler) 64 is used to produce an oversampled sequence x[n] with sampling period $T_s/N$, where N is the oversampling factor and n is the time index. N typically is the same as the oversampling factor of the input to correlator 74, which typically is the same as the oversampling factor for sampling the digital downconverted signals in the SU. In the preferred embodiment, a square root raised cosine pulse is used for pulse shaping. Other pulse shapes also are possible, and pulse shaping is well known in the art. The oversampling factor N=4 is used for the subscriber unit in the preferred embodiment. In the notation used herein, x[n] are the complex valued sample values, where n is the time index. A first differential sample encoder 66 converts this to an output y[n] which is applied to a decimator 68. For example, y[n]=x[n]*x'[n−$M_O$], where the ' denotes the complex conjugate operator, * denotes multiplication, and $M_O$ is any non-negative integer and is typically set to N. The quantity Td=$M_O$*$T_s$|N is called the differential sample encoding period, and typically is set to be the sample period $T_s$. In an improved embodiment, differential sample encoder 66 carries out the operations $y_1$[n]=x[n]*x'[n−$M_O$] followed by y[n]=LPF{$y_1$[n]} where LPF { } is a low pass filter operation selected to reduce the noise in the final differential sample encoded sequence y[n]. The differential sample encoded sequence y[n] is then decimated by L to produce a decimated output a[n]. In general, L is any integer satisfying 0≦L ≦N, and typically set L=N. The decimated output a[n] is then processed by a sampling rate expander to produce a sequence b[n] at the sampling period $T_s$|N. The output b[n] of the sampling rate expander 69 which has an expanding rate L, is related to its input a[n] by:

$$b[n] = \begin{cases} a[n/L], & n = 0, \pm L, \pm 2L, \ldots \\ 0 & \text{otherwise.} \end{cases}$$

In the preferred embodiment, the output b[n] of sampling rate expander 69 is then normalized by normalizer 70 which divides each element of the sequence by the Euclidean vector norm of the whole sequence, i.e., by the square root of the sum of the magnitudes of the samples in the sequence, to produce a reference sequence h[n]. This sequence typically is stored in memory 71 for use as the coefficients for correlator 74 during received signal acquisition.

The processing of the received sequence of N-times oversampled complex valued samples (denoted z[n]) in the SU in order to detect the presence of the control sequence is now described. While the notation z[n] will be used herein to denote a complex valued signal, it should be understood that it is the I and Q samples, e.g. from ADCs 30 and 32, which will be processed. These have a sampling period $T_s$|N, where $T_s$ and N have the same meaning, and the same values as when forming the correlator coefficients above. Sampled sequence z[n] is converted by a second differential sample encoder 72 to a signal u[n], where differential sample encoder 72 is part of the SU. The received sequence z[n] is differential sample encoded in the same way as the reference sequence, that is, in one embodiment u[n]=z[n]*z'[n−$M_O$], and in an improved embodiment, $u_1$[n]=z[n]*z'[n−$M_O$] followed by u[n]=LPF{$u_1$[n]} where LPF { } is a low pass filter chosen to reduce the noise in u[n]. The correlator 74, which also is part of the SU, is then able to produce an output v[n] by correlating the differential sample encoded sequence signal u[n] with the correlator coefficients, which are the (typically pre-stored in memory 71) values of reference sequence h[n]. The complex valued correlation is $$\tilde{v}[n] = \sum_{i=0}^{M-1} h'[M - i] * u[n - i],$$

where M is the length (in samples) of the correlator coefficient sequence, which is the differential sample encoded reference sequence. In the preferred embodiment, M=23*N (the differential sample encoded sequence corresponding to the thirty-two bit Unique Word plus the last eighteen bits of the preamble). The reference sequence h[n] typically contains many zeroes generated by the sample rate expander. Thus there are many zero-valued coefficients in the correlator 74. This allows the required amount of computing to be reduced because only the products in the sum for which h[n] is non-zero need to be computed. Such reduction in computing power can be invested in reducing the cost of the hardware and the battery power it would otherwise consume with very high clock rates. In one alternate embodiment, no decimation and rate expansion occurs, so that the correlation is of the differential sample encoded sequence u[n] with the differential sample encoded sequence y[n].

The decimation then rate expansion of sequence y[n] produces a reference sequence h[n] which contains a sparse subset of sequence y[n] in which some of the values of y[n] have been forced to have a value of zero. Thus sequence h[n] is called a zero-filled subset reference sequence. The net effect is that the correlation is performed not as a sum but rather as a partial sum on only some of the correlation products. As would be clear to one of ordinary skill in the art, using decimation and rate expansion of y[n] is only one method of determining such a zero-filled subset reference sequence. For example, an alternate embodiment may determine the full sequence y[n] then set some of the values to zero. It needs to be remembered that the zero-filled subset reference sequence h[n] typically is determined off line only once.

Also, correlating using such a zero-filled subset reference sequence as the set of coefficients for the correlator is only one method of correlating using a partial sum. Other methods of performing such a partial sum correlation are also within the scope of the invention. For example, in alternate embodiments, the summation operation in the correlation may be forced to add not over an index sequentially incremented by one, but over an index sequentially incremented by a larger number.

Where computing power is available, the preferred embodiments for correlator 74 form v[n] as a function of the magnitude of complex valued correlation $\tilde{v}$[n], e.g., v[n]=|$\tilde{v}$[n]|. Alternatively, the output of the correlator 74 is formed as a function of the real part of $\tilde{v}$[n]. In both alternatives, the presence of an amplitude peak in v[n] indicates the presence of the reference signal in the original sequence. Both alternatives also result in one of the principle advantages of this aspect of the invention; namely, the initial acquisition by the subscriber unit being essentially robust in the face of ordinarily troublesome carrier frequency offsets. The first alternative, however, is more robust to offset than the second alternative, while the second offers the benefit of reducing the number of computations required in the correlator and has about the same reference signal detection performance as the first, albeit with increased sensitivity to carrier frequency offsets.

In an alternative embodiment, determining the real part of $\tilde{v}$[n] may be carried out directly without first determining $\tilde{v}$[n] by using $$v[n] = \sum_{i=0}^{M-1} \text{Re}\{h'[M-i]\} * \text{Re}\{u[n-i]\} + \text{Im}\{h'[M-i]\} * \text{Im}\{u[n-i]\}$$

where Re { } and Im { } denote the real and imaginary parts, respectively.

The output v[n] is squared by a unit 76 to produce a correlation related signal w[n]. This squaring in the preferred embodiment enables one to avoid taking square roots in determining magnitudes. Thus, typically, v[n] is not explicitly determined, rather units 74 and 76 are combined to directly produce w[n]. In alternate embodiments, unit 76 may be omitted or may determine some other monotonic function of correlation output v[n] to produce correlation related signal w[n].

A threshold detector 78 outputs a signal when the correlator related signal w[n] is higher than a threshold indicating that the reference signal is present in the control message. The location of the correlation peak provides the timing phase. In practice, interfering signals can arbitrarily lift the aggregate signal floor. For example, in a PHS system, adjacent timeslots may be used to carry traffic (TCH) messages, and these adjacent bursts may be mistaken for a control message if their transmit power levels are high. In an improved embodiment, the correlation related signal w[n] is compared with a quantity which is a function of the signal magnitude. The function used in the preferred embodiment is a magnitude squaring device 80. That is, one prevents the varying signal magnitude from causing an adverse effect by computing a signal magnitude dependent threshold d[n], where d[n] preferably is dependent on the squared magnitude of differential sample encoded sequence u[n].

d[n] preferably is produced using magnitude squaring device 80 followed by a lowpass filter (LPF) 82 as follows. The instantaneous power, p[n], is computed from the differential sample encoded sequence u[n] as p[n]=u[n]*u'[n], and is then filtered to produce d[n] at the output of LPF 82. For example, one LPF response to use is defined by the equation $$d[n] = \gamma p[n] + (1-\gamma)d[n-1], 0 \leq \gamma \leq 1,$$

where γ is typically chosen as L/M. Preferably, the response of LPF 82 is $$d[n] = \sum_{i=0}^{K-1} p[n-i],$$

where K is typically chosen to equal M. Other LPF responses may alternatively be used. The purpose of squarer 80 is to have threshold detector 78 compare signals w[n] and d[n] of similar units (the correlator output is considered as having the same units as signal u[n]). Other embodiments may modify blocks 76 and 80 with w[n] and d[n] having comparable dimensionality, as would be clear to those of ordinary skill in the art. It also would be clear that the purpose of LPF 82 is to filter out noise, and alternate embodiments are possible without LPF 82, with an alternate element for smoothing a signal.

The inputs to the threshold detector 78 are w[n] and d[n]. In one embodiment, the thrshold detector 78 compares w[n] with threshold αd[n], and determines a control message has been found at some sample time n whenever the threshold αd[n] is exceeded. A typical value for α is 0.25 times the vector norm of the reference sequence. In a preferred embodiment, the threshold detector compares input w[n] with threshold αd[n], and if the threshold is exceeded, the sample m is computed which maximizes w[n]/d[n] for n≦m≦n+K. The following can be used to determine m:

```
bestW = w[n];
bestD = d[n];
m=n;
for (i = n+1; i < n+K; i++) {
    if (bestW*d[i] > w[i]*bestD) {
        bestW = w[i];
        bestD = d[i];
        m=i;
    }
}
```

The advantage here is that computationally expensive divisions can be avoided. The value K is typically equal to M. The detector 78 indicates that a control message is detected at sample time m.

In an improved embodiment, alpha (α) may be set adaptively. Initially, α is set to a maximum value $\alpha_{max}$. The value of α is lowered by increment Δα at prescribed intervals of time until a control message is detected. This adaptive method reduces the possibility of falsely detecting a control message in different signal quality, noise and interference environments. A typical value for $\alpha_{max}$ is 0.8, and a typical value for Δα is 0.1.

Frequency Offset Estimation

The correlator produces a periodic peak output at the threshold detector 78 that can be used to directly obtain a frequency offset estimate $f_{est}$. When the reference signal lines up correctly with the input signal z[n] at sample time m, $\angle \tilde{v}[m] \approx \theta$ where ∠ is the phase, and θ is the offset expressed as a phase angle. This will be exactly true in the absence of both noise and unequalized channel multipath. The angle of the in-phase and quadrature samples of the complex correlation that occurs at such correlation peak is divided by 2π times the differential sample encoding period $T_d$ (which preferably is equal to the symbol period $T_s$) to produce the frequency offset estimate, i.e., $f_{est} = \angle I,Q/2\pi T_d$, where $\angle I, Q = \angle \tilde{v}[m] \approx \theta$. It is especially important to note that such a frequency offset estimate comes at almost no cost and is simple and easy to obtain. Also, note that obtaining the frequency offset estimate is not a required precondition to being able to acquire the control channel.

Signal Quality Estimation

The quality of the signal received by the SU is a useful quantity. The signal quality estimate is useful in diagnostics, troubleshooting, controlling transmitter power, aiming/placing antennas, channel assignment, etc. In most systems, it is sent from the subscriber unit to the base station so that the base station can adjust the transmitted power. In another aspect of the invention, the quality of the signal is estimated as w[m]/d[m], where m is the time at which the digital acquisition processor, e.g., Rx-DSP 42, detects a control message.

Antenna Pointing

It is known that some antennas are directional. An array of antennas, for example, may be made to transmit or receive signals preferentially from different directions. For example, an array of antennas may be used and the signals received at each of the array elements may be differently weighted in amplitude and phase to preferentially receive from one or more directions. Such antennas can also be used to transmit preferentially. During signal reception, the received signal strength will depend on which direction the antenna is pointed. In a system in which the subscriber unit location is fixed, for example, a wireless local loop system, proper antenna aiming may be necessary for achieving good communications quality.

Another aspect of the present invention is the use of the signal quality estimate w[m]/d[m] for aiming/placing antennas. The preferred embodiment of the method for antenna aiming is as follows. The antenna of the SU is aimed in one direction, and the initial acquisition processing is applied to attempt to detect a control message. The aiming of the antenna may be done by a human operator or else mechanically. If the processing is successful in finding a control message, the signal quality estimate is used as a quality level. This quality level provides feedback to the operator aiming the antenna. In the case of a human operator, the feedback may be in the form of a visual display, such as a LED scale (e.g., good quality may be 5 LEDs lit, bad quality no LEDs lit). If the feedback indicates inadequate signal quality, the antenna is re-aimed and the process repeats. Once the feedback to the operator indicates adequate quality, the aiming process stops.

Base Station Assignment

In a cellular system, there may be multiple base stations that the SU can connect with. In PHS, for example, multiple base stations typically share the same control channel frequency by transmitting control messages during different timeslots. The SU may have to decide, on the basis of the signals it receives from the different BSs on the control frequency, which BS to connect to. This is the base station assignment problem.

Another aspect of the present invention is a method for base station assignment using the signal quality estimate. In the illustrative embodiment for the PHS system, base station assignment then is an optional further step following the conclusion of the antenna aiming process, wherein the SU:

1. decodes the control message detected by the initial control message acquisition process;
2. determines the base station identification from the message; and
3. transmits an SCCH message to the base station so-identified to register itself with the network.

Timing Alignment

Another aspect of the invention is timing alignment. The method of the present invention provides a way to determine the point in time when a message, as well as the baud point. The baud point normally is the center of the waveform used to shape the pulse representing the data symbol, and is thus the optimal point at which to sample each data symbol. The length of the message is generally predefined in terms of the number of symbols. In the PHS standard, messages are 120 data symbols long, and that includes ramp-up and ramp-down times. Oversampling produces N samples per data symbol period $T_s$.

In preferred embodiments of the present invention, both the message timing and baud point timing are estimated by using the Rx-DSP 42 to detect a control message at time m. The beginning of the control message is estimated to occur at time index [m-round{N(D-½)}], where N is the oversampling factor and D is the position of the last symbol in the reference signal with respect to the control message start, counted in symbols. The "round { }" represents rounding the argument up or down to the nearest integer, and may alternatively be substituted by a truncation to the nearest integer. The baud points are estimated as m incremented by multiples of N, e.g., the baud points are estimated as m, m+N, m+2N, etc.

The following MATLAB code is an example of how to program the Rx-DSP 42 to detects control burst, and if successful, to estimate the frequency offset, the time index for the start of the control burst, and the signal quality of the detected control burst. It would be clear to one of ordinary skill in the art that the actual code used in Rx-DSP 42 is code determined (automatically or manually) from the MATLAB code.

```
% *******************************************
% CONTROL BURST DETECTION, FREQUENCY OFFSET
% DETERMINATION AND TIMING DETERMINATION
% Detects control burst, and if successful,
% estimates the frequency offset, the time index
% for the start of the control burst, and the
% signal quality of the detected control burst
%% *******************************************
function[freqOffsetEst, flagDetect, timeIndex, signalQuality]=. . .
    acq (frameRx, revRef, threshold)
% INPUT: frameRx - oversampled I,Q complex signal sequence
% revRef - the reference signal sequence to correlate against
% threshold - threshold value to be used by threshold detector
% OUTPUT: flagDetect - binary flag set to 1 if control burst
%     detected,   0 otherwise
% *** Remaining output parameters relevant only if flagDetect = 1 ***
% freqOffsetEst - , frequency offset estimate
% timeIndex - time index for start of control burst
% signalQuality - signal quality of the detected control burst
        (0 = poorest quality, 1 = best quality)
% realFlag = 0 => do complex correlation for maximum carrier
        immunity = 1 => do real correlation to save on computations
realFlag = 0;
% initialize flagDetect
flagDetect = 0;
oversample = 8;
rxOversample = 2;
% perform differential encoding of received oversampled sequence
% spaced 1 baud apart
diffRx = frameRx(rxOversample+1:length(frameRx)) .* . . .
    conj (frameRx(1:length(frameRx)-rxOversample));
% compute normalization sequence.
% Convolution is just a simple moving average in this example.
diffPow = diffRx .* conj(diffRx);
denom = conv(diffPow, ones(size(revRef)));
% correlate rx signal with reference signal
% convolution is only done for the non-zero taps of
%   the reference signal
if (realFlag == 1)
  diffCorr = real(conv(diffRx, revRef));
  diffCorr = max(diffCorr,0);
  dCorr = diffCorr .* diffCorr;
else
  complexCorr = conv(diffRx, revRef);
  dCorr = abs(complexCorr) .^ 2;
end;
```

The following MATLAB code is the second part of the code, and is an example of how to program the Rx-DSP 42 to implement the function of the threshold detector 78.

```
% *******************************************
% THRESHOLD METHOD
% *******************************************
detectIndex = [];
sample = 1;
while (sample <= length(dCorr))
  if. (dCorr(sample) > threshold * denom(sample))
  flagDetect = 1;
    maxCorr = dCorr(sample);
    maxDenom = denom(sample);
    maxIndex = sample;
    endSample = sample + length(revRef);
    % Over interval numSamplesPerSymbol *
    % (length of ref seq),
    % look for maximum.
    sample = sample + 1;
    while (sample < endsample)
    if (dCorr (sample) *maxDenom > maxCorr*denom(sample))
```

-continued

```
    maxCorr = dCorr(sample);
    maxDenom = denom(sample);
    maxIndex = sample;
   end,
   sample = sample + 1;
   end,
   detectIndex = maxIndex;
  end
  sample = sample + 1;
 end
 ang = angle(complexCorr(detectIndex));
 if (flagDetect == 1)
   freqOffsetEst = ang / (2*pi / 192e3);
   signalQuality = maxCorr / maxDenom;
   timeIndex = detectIndex;
 end
```

The following MATLAB code is an example of how to program the Rx-DSP 42 to generate the reference signal h[n] to be correlated against in control burst detection. It is the functional equivalent of the modulator 62, pulse shaping filter 64, differential encoder 66, decimator 68, and rate expander 69 in FIG. 3.

```
%******************************************************
% GENERATION OF THE REFERENCE SIGNAL TO
% BE CORRELATED AGAINST IN CONTROL BURST DETECTION
%******************************************************
% INPUT: prRef
% input is the pulse-shaped oversampled signal sequence containing
% the modulated known bits of the control burst. The pulse shape,
% the known bit sequence and the modulation method are
% specified by the air interface.
% OUTPUT: revRef
% output is the reference signal to be correlated against
%******************************************************
oversample = 8;
rxOversample = 2;
prRefSamplesPerBaud = 1;
prRefDecimate = oversample / prRefSamplesPerBaud;
prRefNumZerosPerSample = rxOversample/prRefSamplesPerBaud - 1;
prRef = idealSig(startSeq*oversample + 1:endSeq*oversample);
prRef = prRef(1:prRefDecimate:length(prRef));
diffRef = prRef (prRefSamplesPerBaud + 1:length(prRef)) ...
.* conj(prRef (1:length(prRef)-prRefSamplesPerBaud));
diffRef = kron(diffRef,[1 zeros(1, prRefNumZerosPerSample)]);
revRef = diffRef(length(diffRef)+1-[1:length(diffRef)])';
revRef = revRef / norm(revRef);
```

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for control channel acquisition by a receiver in a wireless communication system wherein a known reference signal is periodically sent, the method comprising the steps of:

(a) producing a sampled sequence z[n] of complex valued digital samples from a baseband radio frequency signal that may include the known reference sequence, the baseband radio frequency signal determined from a received signal received at the receiver;

(b) differential sample encoding said sampled sequence z[n] to produce a differential sample encoded sample sequence u[n];

(c) differential sample encoding a version x[n] of said reference signal to produce a differential sample encoded reference sequence y[n]; and (d) correlating the differential sample encoded sample sequence u[n] with the differential sample encoded reference sequence y[n] to produce a correlator output signal v[n] which has an amplitude peak when the known reference signal exists in the baseband radio frequency signal, wherein the differential sample encoding of steps (b) and (c) are chosen to reduce the sensitivity of any amplitude peak in the correlator output signal v[n] to variations in frequency offset in the baseband radio frequency signal, and wherein the differential encoding of steps (b) and (c) determine $$u[n]=z[n]*z'[n-M_O],$$

and $$y[n]=x[n]*x'[n-M_O],$$

respectively, where ' denotes the complex conjugate operation, * denotes multiplication, and $M_O$ is a non-negative integer which determines a differential encoding period $T_d$.

2. The method of claim 1 wherein the baseband radio frequency signal is digitally modulated with a symbol period $T_s$ and the differential encoding period $T_d$ is equal to the symbol period $T_s$.

3. The method of claim 1, wherein the step of correlating determines a partial sum of correlation products.

4. The method of claim 3 wherein,
the partial sum is determined from a zero-filled subset reference sequence h[n], h[n] determined by setting some of the sample values of the differential sample encoded reference sequence y[n] to zero and normalizing so that the zero-filled subset reference sequence h[n] is normalized, and
wherein said step of correlating correlates the differential sample encoded sample sequence u[n] with the zero-filled subset reference sequence h[n].

5. The method of claim 4 wherein the setting of some of the sample values of the differential sample encoded sample sequence y[n] to zero comprises decimating the differential sample encoded sample sequence y[n] to obtain a decimated sequence and upsampling the decimated sequence, normalizing the upsampled decimated sequence providing the zero-filled subset reference sequence h[n].

6. The method of claim 1, wherein correlator output signal v[n] is determined by the amplitude of the complex valued correlation of the differential sample encoded sample sequence u[n] with the reference sequence h[n].

7. The method of claim 1, wherein the correlator output signal v[n] is determined by the real part of the complex valued correlation of the differential sample encoded sample sequence u[n] with the reference sequence h[n].

8. The method of claim 1, further comprising the steps of:
   (e) determining a correlator dependent signal w[n], the correlator dependent signal w[n] being a monotonic function of the correlator output signal v[n]; and
   (f) determining a signal magnitude dependent threshold d[n], the signal magnitude dependent threshold d[n] monotonically dependent on the magnitude of the differential sample encoded sample sequence u[n].
   (g) comparing the correlator dependent signal w[n] with the signal magnitude dependent threshold d[n] to indicate when the correlator dependent signal w[n] exceeds a threshold constant $\alpha$ times the signal magnitude dependent threshold d[n].

9. The method of claim 8 wherein
said determining the correlator dependent signal w[n] determines the correlator dependent signal w[n] to be the squared value of the correlator output signal v[n]; and
said determining the signal magnitude dependent threshold d[n] determines the signal magnitude dependent threshold d[n] to be the squared value of the differential sample encoded sample sequence u[n].

10. The method of claim 8 wherein
said determining the correlator dependent signal w[n] determines the correlator dependent signal w[n] to be the squared value of the correlator output v[n]; and
said determining the signal magnitude dependent threshold d[n] includes low pass filtering the squared value of the differential sample encoded sample sequence u[n] to generate the signal magnitude dependent threshold d[n].

11. The method of claim 8 further comprising the steps of:
   (h) determining a time alignment m as the sample time at which the correlator dependent signal w[n] exceeds the threshold constant $\alpha$ times the signal magnitude dependent threshold d[n].

12. The method of claim 11 further comprising the steps of:
   (i) determining a signal quality estimate w[m]/d[m] of the received signal as the ratio of the value at the time alignment m of the correlator dependent signal w[n] to the value at the time alignment m of the signal magnitude dependent threshold d[n].

13. The method of claim 12 wherein the receiver includes an antenna, the method further comprising:
   (j) pointing the antenna by varying the direction of the antenna until the signal quality estimate w[m]/d[m] reaches an acceptable quality level.

14. The method of claim 13 wherein the acceptable level is the maximum value of the signal quality estimate.

15. The method of claim 8 wherein initially step (g) of comparing is carried out with an initial value of the threshold constant $\alpha$, the method further comprising carrying out at prescribed intervals the additional step of:
   (h) repeating steps (a), (b), (d), (e), (f), and (g), each successive repetition varying the value of threshold constant $\alpha$ according to a search strategy, the repetitions terminating when the correlator dependent signal w[n] exceeds the threshold constant $\alpha$ times the signal magnitude dependent threshold d[n].

16. The method of claim 15 wherein the search strategy in repeating step (h) repeats steps (a), (b), (d), (e), (f), and (g) up to a maximum number of repetitions, each successive repetition using a value for the threshold constant $\alpha$ which is less than the previous value of the threshold constant $\alpha$.

17. The method of claim 15 wherein the search strategy in repeating step (h) repeats steps (a), (b), (d), (e), (f), and (g) while the threshold constant $\alpha$ a is larger than or equal to a minimum value, each successive repetition using a value for the threshold constant $\alpha$ which is less than the previous value of the threshold constant $\alpha$.

18. The method of claim 11 further comprising:
   (i) computing an angle offset $\theta$ as the phase angle at the time alignment m of the complex valued correlation of the differential sample encoded sample sequence u[n] with the zero-filled subset reference sequence h[n];
   determining a carrier frequency offset $f_{est}$ as a function of the angle offset $\theta$.

19. The method of claim 18 wherein said step (j) determines the carrier frequency offset $f_{est}$ as the angle offset $\theta$ divided by a denominator equal to 2 times $\pi$ times the differential sample encoding period $T_d$, i.e., $$f_{est} = \frac{\theta}{2 * \pi * T_d}$$

where * denotes multiplication.

20. The method of claim 11 further comprising:
   (i) determining the baud points of the sampled sequence z[n] as the time alignment m and all sample times which are distant from the time alignment m a multiple of the number of samples in the symbol period $T_s$.

21. A method for determining the presence of a known reference signal in a baseband radio frequency signal from a sampled sequence z[n] of complex valued digital samples of the baseband radio frequency signal, the method comprising the steps of:
   (a) differential sample encoding said sampled sequence z[n] to produce a differential sample encoded sample sequence u[n]; and
   (b) correlating the differential sample encoded sample sequence u[n] with a set of correlator coefficients, the correlator coefficients including a differential sample encoded reference sequence y[n] determined by sampling and differential sample encoding a version x[n] of said reference signal, the correlating producing a correlator output signal v[n] which has an amplitude peak when the known reference signal exists in the baseband radio frequency signal,
   the differential sample encoding in u[n] and y[n] being the same type and chosen to reduce the sensitivity of any amplitude peak in the correlator output signal v[n] to variations in frequency offset in the baseband radio frequency signal, and the differential encoding in u[n] and v[n] determining $$u[n] = z[n] * z'[n - M_O],$$

and $$y[n]=x[n]*x'[n-M_O],$$

respectively, where ' denotes the complex conjugate operation, * denotes multiplication, and $M_O$ is a non-negative integer which determines a differential encoding period $T_d$.

22. A wireless communication system, comprising:
  (a) a radio receiver, the radio receiver including an antenna for receiving a received signal, a front end, coupled to the antenna and producing a sequence of complex valued digital samples of a baseband radio frequency signal from the received signal;
  (b) a digital signal processor for differential sample encoding said samples to produce a differential sample encoded sample sequence;
  (c) a correlator, including a correlator coefficient memory for storing correlator coefficients, the correlator coupled to the digital signal processor and correlating the differential sample encoded sample sequence with the correlator coefficients, the correlator having an output comprising a correlator output signal;
  (d) means for differential sample encoding a sampled version x[n] of the known reference signal to produce a differential sample encoded reference sequence y[n]; and
  (e) means for loading the differential sample encoded reference sequence into the correlator coefficient memory,
  wherein the differential encoding of steps (b) and (d) determine $$u[n]=z[n]*z'[n-M_O],$$

and $$y[n]=x[n]*x'[n-M_O],$$

receptively, where ' denotes the complex conjugate operation, * denotes multiplication, and $M_O$ is a non-negative integer which determines a differential encoding period $T_d$.

23. The radio receiver of claim 22 wherein the baseband radio frequency signal is digitally modulated with a symbol period $T_s$ and the differential encoding period $T_d$ is equal to the symbol period $T_s$.

24. The radio receiver of claim 23 wherein the loading means (e) loads into the correlator coefficient memory a zero-filled subset reference sequence of the differential sample encoded reference, the zero-filled subset reference sequence determined by setting some of the sample values of the differential sample encoded sample sequence to zero and normalizing so that the zero-filled subset reference sequence is normalized.

25. The radio receiver of claim 24 wherein the setting of some of the sample values of the differential sample encoded sample sequence to zero comprises decimating the differential sample encoded reference sequence to obtain a decimated sequence and upsampling the decimated sequence, normalizing the upsampled decimated sequence providing the zero-filled subset reference sequence.

26. The radio receiver of claim 22 wherein the correlator output signal is determined by the amplitude of the complex valued correlation of the differential sample encoded sample sequence with the correlator coefficients.

27. The radio receiver of claim 22 wherein the correlator output signal is determined by the real part of the complex valued correlation of the differential sample encoded sample sequence with the correlator coefficients.

28. The radio receiver of claim 22 further comprising:
  (f) monotonic function means with an input coupled to the output of the correlator, and an output, the monotonic function means output comprising a correlator dependent signal which is a monotonic function of the signal at the monotonic function means input;
  (g) signal magnitude function means having an input comprising the differential sample encoded sample sequence and having an output comprising a signal magnitude dependent threshold which is monotonically dependent on the magnitude of the differential sample encoded sample sequence; and
  (h) a thresholder including means for setting the value of a threshold constant and having a first input, a second input, and a main output, the thresholder comparing the first input with the second input and producing a detect signal at the main output when the first input exceeds the threshold constant value set by the setting means times the second input, the first input coupled to the monotonic function means output, and the second input coupled to the signal magnitude function means output.

29. The radio receiver of claim 28 wherein the monotonic function means (f) is a first magnitude squarer and the signal magnitude function means is a second magnitude squarer, the receiver further comprising:
  (i) a low pass filter having an input and an output with the low pass filter input coupled to the output of the second magnitude squarer and the low pass filter output coupled the second input of the thresholder (h).

* * * * *

UNITED STATES PATENT AND TRADEMARK OFFICE
CERTIFICATE OF CORRECTION

PATENT NO. : 5,909,471  
DATED : June 1, 1999  
INVENTOR(S) : Louis C. Yun

Page 1 of 1

It is certified that error appears in the above-identified patent and that said Letters Patent is hereby corrected as shown below:

Column 9,  
Line 25, please change "$0 \leq L \leq N$" to —$0 < L \leq N$—.

Column 12,  
Line 5, please change "$n \leq m \leq n+K$" to —$n \leq m < n+K$—.

Signed and Sealed this

Thirty-first Day of July, 2001

*Attest:*

Nicholas P. Godici

*Attesting Officer*

NICHOLAS P. GODICI  
*Acting Director of the United States Patent and Trademark Office*